United States Patent
Wietfeldt et al.

(10) Patent No.: US 10,474,622 B1
(45) Date of Patent: Nov. 12, 2019

(54) METHOD AND APPARATUS FOR LATENCY MANAGEMENT OF DATA COMMUNICATION OVER SERIAL BUS

(71) Applicant: QUALCOMM Incorporated, San Diego, CA (US)

(72) Inventors: Richard Dominic Wietfeldt, San Diego, CA (US); Lalan Jee Mishra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/036,273

(22) Filed: Jul. 16, 2018

(51) Int. Cl.
*G06F 13/42* (2006.01)
*G06F 13/40* (2006.01)

(52) U.S. Cl.
CPC ...... *G06F 13/4291* (2013.01); *G06F 13/4059* (2013.01); *G06F 13/4295* (2013.01)

(58) Field of Classification Search
CPC combination set(s) only.
See application file for complete search history.

(56) References Cited

U.S. PATENT DOCUMENTS

| 8,995,333 | B2 | 3/2015 | Gruber et al. | |
|---|---|---|---|---|
| 9,135,197 | B2 | 9/2015 | Gruber et al. | |
| 2010/0088442 | A1* | 4/2010 | Kuschke | H04L 12/40189 710/110 |
| 2018/0052791 | A1* | 2/2018 | Srivastava | G06F 1/3253 |
| 2018/0357192 | A1* | 12/2018 | Chun | G06F 13/4282 |
| 2018/0357194 | A1* | 12/2018 | Ulmer | G06F 13/3625 |

OTHER PUBLICATIONS

Nielsen J.J., et al., "Ultra-Reliable Low Latency Communication (URLLC) using Interface Diversity", IEEE Transactions on Communications, vol. 66, No. 3, arXiv:1711.07771v1 [cs.IT], Nov. 21, 2017, pp. 1322-1334.
Nielsen J.J., et al., "Optimized Interface Diversity for Ultra-Reliable Low Latency Communication (URLLC)", arXiv:1712.05148v1 [cs.IT] Dec. 14, 2017, pp. 1-6.
Sheng Z., et al., "Delay Analysis and Time-Critical Protocol Design for In-Vehicle Power Line Communication Systems", IEEE Transactions on Vehicular Technology, 2017, pp. 1-14.

* cited by examiner

*Primary Examiner* — Raymond N Phan
(74) *Attorney, Agent, or Firm* — Loza & Loza LLP

(57) ABSTRACT

Systems, methods, and apparatus for improving bus latency are described. A method performed at a transmitting device includes receiving a datagram to be transmitted from the transmitting device to a receiving device, determining whether a first serial bus coupling the transmitting device to the receiving device is available to transmit the datagram, determining whether a second serial bus coupling the transmitting device to the receiving device is available to transmit the datagram, transmitting the datagram over the first serial bus when the first serial bus is available, and transmitting the datagram over the second serial bus when the second serial bus is available and when the first serial bus is unavailable. The datagram is associated with a latency budget. The first or second serial bus may be available to transmit the datagram when active and likely to transmit the datagram within a time limit defined by the latency budget.

30 Claims, 11 Drawing Sheets

METHOD AND APPARATUS FOR LATENCY
MANAGEMENT OF DATA
COMMUNICATION OVER SERIAL BUS

TECHNICAL FIELD

The present disclosure relates generally to serial communication over a shared serial bus and, more particularly, to optimizing latencies associated with time-critical data transmitted over the shared serial bus.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a multi-drop serial bus or a parallel bus. General-purpose serial interfaces known in the industry include the Inter-Integrated Circuit (I2C or I$^2$C) serial bus and its derivatives and alternatives. The Mobile Industry Processor Interface (MIPI) Alliance defines standards for the I3C interface, the Radio Frequency Front-End (RFFE) interface, system power management interface (SPMI), and other interfaces.

In one example, the I3C serial bus may be used to connect sensors and other peripherals to a processor. In some implementations, multiple bus masters are coupled to the serial bus such that two or more devices can serve as bus master for different types of messages transmitted on the serial bus. In another example, the RFFE interface defines a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communications device, multiple antennas and radio transceivers may support multiple concurrent RF links. In another example, SPMI specifications provide a hardware interface that may be implemented between baseband or application processors and peripheral components. In some examples, an SPMI bus is deployed to support power management operations within a device.

In many instances, a multi-drop serial bus may be provided to support high-priority, low-latency communication between an application processor and certain peripherals, and other lower-priority communication. Latency can be adversely affected when multiple devices coupled to the serial bus are concurrently active. Degraded latencies can lead to an increase in dropped packets, session timeouts and retransmissions on the serial bus. As mobile communication devices continue to include a greater level of functionality, improved serial communication techniques are needed to improve latencies and/or handling of priority traffic on a serial bus that couples peripherals and application processors.

SUMMARY

Certain aspects of the disclosure relate to systems, apparatus, methods and techniques that can support increased data rates for a serial bus without increasing bus clock frequency and without modifying encoding of the data transmitted on the data line.

In various aspects of the disclosure, a method performed at a transmitting device coupled to a serial bus includes receiving a datagram to be transmitted from the transmitting device to a receiving device, determining whether a first serial bus coupling the transmitting device to the receiving device is available to transmit the datagram, determining whether a second serial bus coupling the transmitting device to the receiving device is available to transmit the datagram, transmitting the datagram over the first serial bus when the first serial bus is available, and transmitting the datagram over the second serial bus when the second serial bus is available and when the first serial bus is not available. The datagram may be associated with a latency budget. The first serial bus may be available to transmit the datagram when the first serial bus is active and likely to transmit the datagram within a time limit defined by the latency budget. The second serial bus may be available to transmit the datagram when the second serial bus is active and likely to transmit the datagram within the time limit defined by the latency budget.

In one aspect, the method includes transmitting the datagram over the first serial bus when the second serial bus is not available. The datagram may be one of a plurality of datagrams in a transaction conducted between the transmitting device and the receiving device. The method may include transmitting a first portion of the plurality of datagrams over the first serial bus while concurrently transmitting a second portion of the plurality of datagrams over the second serial bus when the first serial bus is available and the second serial bus is available. The method may further include identifying the first portion of the plurality of datagrams using one or more first identifiers transmitted over the first serial bus, and identifying the second portion of the plurality of datagrams using one or more second identifiers transmitted over the second serial bus.

In one aspect, the first serial bus is determined to be available when a latched bus park cycle is detected by the transmitting device.

In certain aspects, the method may include transmitting the datagram over the second serial bus when the second serial bus is available and when the first serial bus is not active or not expected to transmit the datagram within the time limit defined by the latency budget. The datagram may be one of a plurality of datagrams in a transaction conducted between the transmitting device and the receiving device. The method may include transmitting a first portion of the plurality of datagrams over the first serial bus and a second portion of the plurality of datagrams over the second serial bus when the first serial bus is active but not expected to transmit the datagram within the time limit set by the latency budget and the second serial bus is active. The first serial bus is determined to be not available when transmission of the datagram fails to satisfy the time limit set by the latency budget.

In some aspects, the method includes estimating a first expected latency for transmitting the datagram based on transactions that are ongoing or queued for the first serial bus, determining that the datagram can be transmitted over the first serial bus within the time limit set by the latency budget when the first expected latency is less than the time limit set by the latency budget, estimating a second expected latency for transmitting the datagram based on transactions that are ongoing or queued for the second serial bus, and determining that the datagram can be transmitted over the second serial bus within the time limit set by the latency budget when the second expected latency is less than the time limit set by the latency budget. The first expected latency and the second expected latency may be determined using a history of prior transmissions and associated latencies.

In one aspect, the first serial bus is operated in accordance with a first protocol and the second serial bus is operated in accordance with a second protocol that is different from the first protocol. The first serial bus and the second serial bus may be operated in accordance with the same protocol.

In various aspects of the disclosure, an apparatus has a plurality of serial buses, a first device coupled to a first serial bus of the plurality of serial buses through a first interface and coupled to a second serial bus of the plurality of serial buses through a second interface, and a second device coupled to the first serial bus and the second serial bus. The first device may be configured to receive a datagram to be transmitted from the transmitting device to a receiving device, determine whether the first serial bus is available to transmit the datagram, determine whether the second serial bus is available to transmit the datagram, transmit the datagram over the first serial bus when the first serial bus is available, and transmit the datagram over the second serial bus when the second serial bus is available and when the first serial bus is not available. The datagram may be associated with a latency budget. The first serial bus may be available to transmit the datagram when the first serial bus is active and likely to transmit the datagram within a time limit defined by the latency budget. The second serial bus may be available to transmit the datagram when the second serial bus is active and likely to transmit the datagram within the time limit defined by the latency budget.

In various aspects of the disclosure, a processor-readable storage medium has code for receiving a datagram to be transmitted from the transmitting device to a receiving device, determining whether a first serial bus coupling the transmitting device to the receiving device is available to transmit the datagram, determining whether a second serial bus coupling the transmitting device to the receiving device is available to transmit the datagram, transmitting the datagram over the first serial bus when the first serial bus is available, and transmitting the datagram over the second serial bus when the second serial bus is available and when the first serial bus is not available. The datagram may be associated with a latency budget. The first serial bus may be available to transmit the datagram when the first serial bus is active and likely to transmit the datagram within a time limit defined by the latency budget. The second serial bus may be available to transmit the datagram when the second serial bus is active and likely to transmit the datagram within the time limit defined by the latency budget.

In various aspects of the disclosure, an apparatus includes means for receiving a datagram to be transmitted from the transmitting device to a receiving device, means for determining whether a first serial bus coupling the transmitting device to the receiving device is available to transmit the datagram, means for determining whether a second serial bus coupling the transmitting device to the receiving device is available to transmit the datagram, and means for transmitting the datagram. The datagram is transmitted over the first serial bus when the first serial bus is available. The datagram is transmitted over the second serial bus when the second serial bus is available and when the first serial bus is not available. The datagram may be associated with a latency budget. The first serial bus may be available to transmit the datagram when the first serial bus is active and likely to transmit the datagram within a time limit defined by the latency budget. The second serial bus may be available to transmit the datagram when the second serial bus is active and likely to transmit the datagram within the time limit defined by the latency budget.

DETAILED DESCRIPTION

Figure 1:
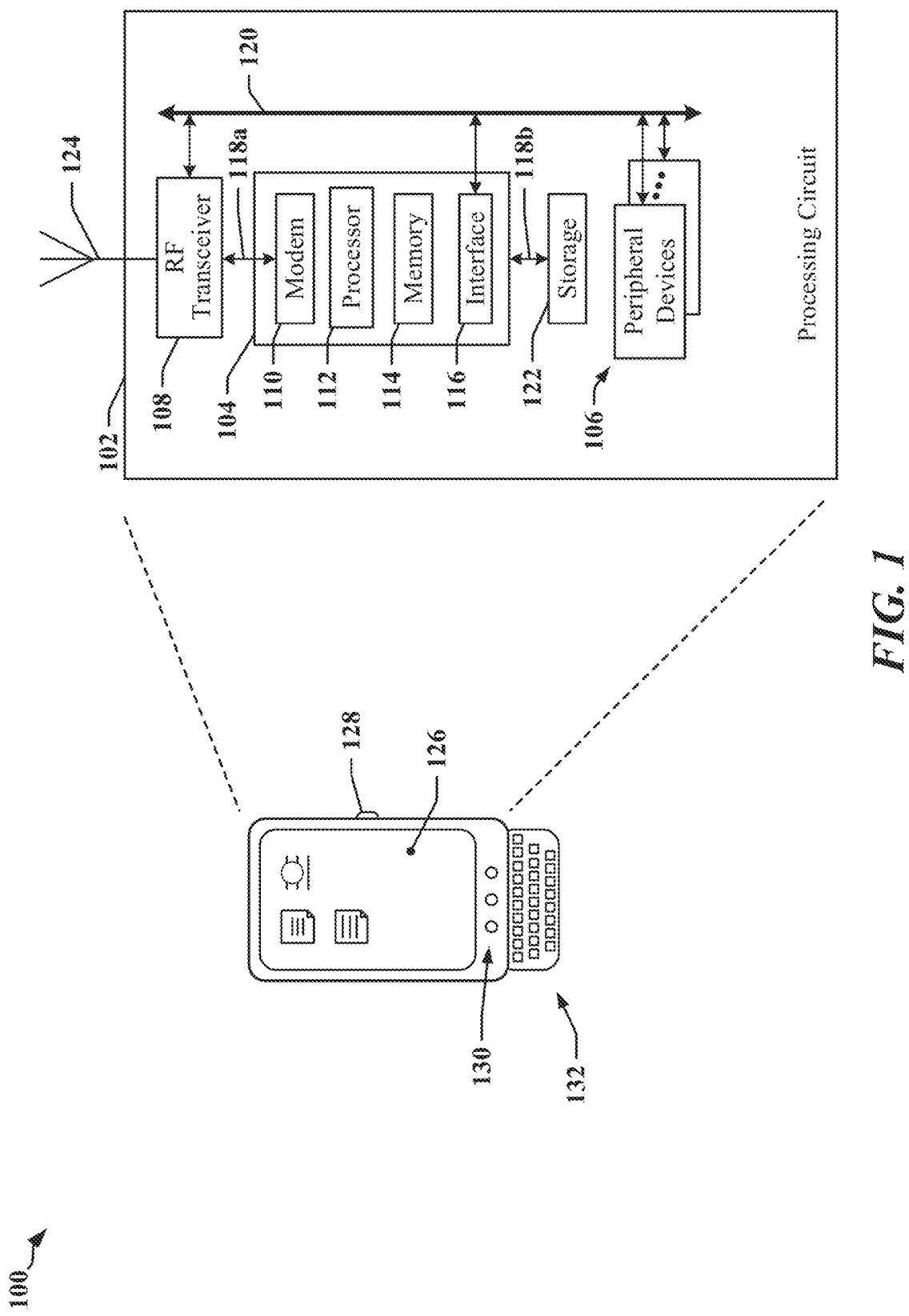
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. For example, the serial bus may be operated in accordance with an I2C, I3C, SPMI, and/or RFFE protocol, or other protocol that may be configured for half-duplex operation. Increased utilization of serial buses, and/or the imposition of more stringent timing constraints in support of applications, peripherals and sensors can result in demand for reduced transmission latencies. Transmission latency may include the time required to terminate a transaction in process on the serial bus, bus turnaround (between transmit mode and receive mode), bus arbitration and/or command transmissions specified by protocol.

High bus latency can limit the capabilities and functionality of a serial bus in certain applications, and certain applications with strict latency requirements can fail if latency targets on transmissions are missed. For example, coexistence messages are transmitted in multi-radio radio frequency (RF) devices between components that have the potential to interfere with one another, and coexistence relies on predictable worst case bus latency. Violation of the bus latency thresholds affecting coexistence messages can compromise operation of a multi-radio device and could cause damage to certain front-end components of the multi-radio device.

Latency violations can be caused by various factors, including delays in start of transmission of a low-latency message caused by in-progress long messages, multiple messages and/or long messages queued ahead of the low-latency message, and/or losing one or more bus arbitration cycles when attempting to gain access to a multi-drop bus. Certain bus protocols enable an in-flight message to be interrupted or terminated when a high-priority message is received for transmission by the bus interface. In many implementations, multiple sources of high-priority messages may contend for access to the multi-drop bus, and the bus interface may be prohibited by protocol from interrupting or prematurely terminating an in-flight message to accelerate transmission of a later-arriving high-priority message. Bus arbitration may be used to select between devices that have queued high-priority messages. In some instances, "greedy" behavior of a highest-priority device with large volumes of data to be transferred can block lower-priority devices from accessing the multi-drop bus for prolonged periods of time by winning arbitration repetitively. Bus latency considerations may limit the number of devices that can be coupled to a multi-drop bus, such as an I3C, RFFE or SPMI serial bus.

Systems adapted according to certain aspects disclosed herein may be implemented with two or more serial buses that are capable of handling latency-sensitive messages. For example, a first serial bus may be coupled to a bus interface designated or configured to serve as the primary interface between devices within the system, while a second serial bus may be coupled to a bus interface designated or configured to serve as a diversity interface. The system may be configured with the capability of sending any message across the primary interface, the diversity interface, or both interfaces. Two or more interfaces can be active at the same time. The primary and diversity interfaces may operate in accordance with the same protocol or different protocols. In one example, the primary interface may operate in accordance an RFFE protocol, while the diversity interface may operate in accordance an SPMI protocol. In another example, both the primary interface and the diversity interface may be operated in accordance an RFFE protocol. In another example, both the primary interface and the diversity interface may be operated in accordance an SPMI protocol. In another example, both the primary interface and the diversity interface may be operated in accordance an I3C protocol. The availability of multiple interfaces for carrying high-priority messages may enable low-latency messages to be communicated when latency constraints cannot be met by a single interface, including on occasions where bus throughput, utilization and/or other operating characteristics exceed the capabilities of a single bus.

Certain aspects disclosed herein may be applicable to a serial bus operated in accordance with an I2C, I3C, SPMI, and/or RFFE protocol, or another protocol. Certain aspects are applicable to a serial bus operated in half-duplex mode or full-duplex mode. Certain aspects are applicable to point-to-point interfaces including UART-based interfaces, line multiplexed UART (LM-UART) interfaces, and virtual GPIO (VGI) and messaging interfaces. Certain aspects are applicable to multipoint interfaces and/or interfaces operated in point-to-point mode.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that employs a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to cooperate with the display 126, keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
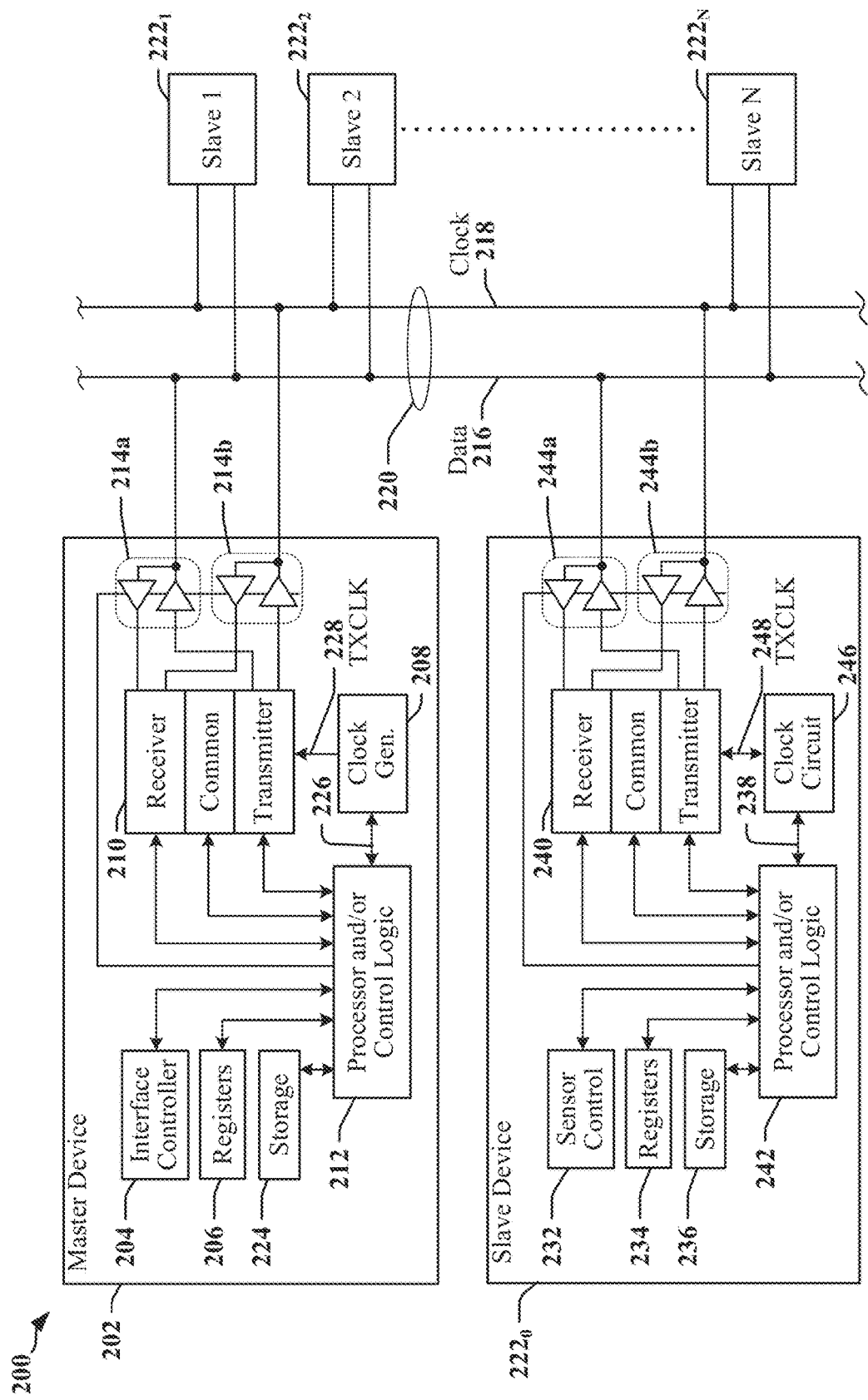
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an applications processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communications between devices 202 and $222_0$-$222_N$ over the serial bus 220 is controlled by a bus master 202. Certain types of bus can support multiple bus master devices 202.

In one example, a bus master device 202 may include an interface controller 204 that may manage access to the serial bus, configure dynamic addresses for slave devices $222_0$-$222_N$ and/or generate a clock signal 228 to be transmitted on a clock line 218 of the serial bus 220. The bus master device 202 may include configuration registers 206 or other storage 224, and other control logic 212 configured to handle protocols and/or higher level functions. The control logic 212 may include a processing circuit such as a state machine, sequencer, signal processor or general-purpose processor. The bus master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with RFFE, I2C, I3C, SPMI, or other protocols. At least one device 202, $222_0$-$222_N$ may be configured to operate as a master device and a slave device on the serial bus 220. Two or more devices 202, $222_0$-$222_N$ may be configured to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 carries data on a data line 216 and a clock signal on the clock line 218. In some instances, data may be encoded in the signaling state, or transitions in signaling state of the data line 216 and the clock line 218.

Figure 3:
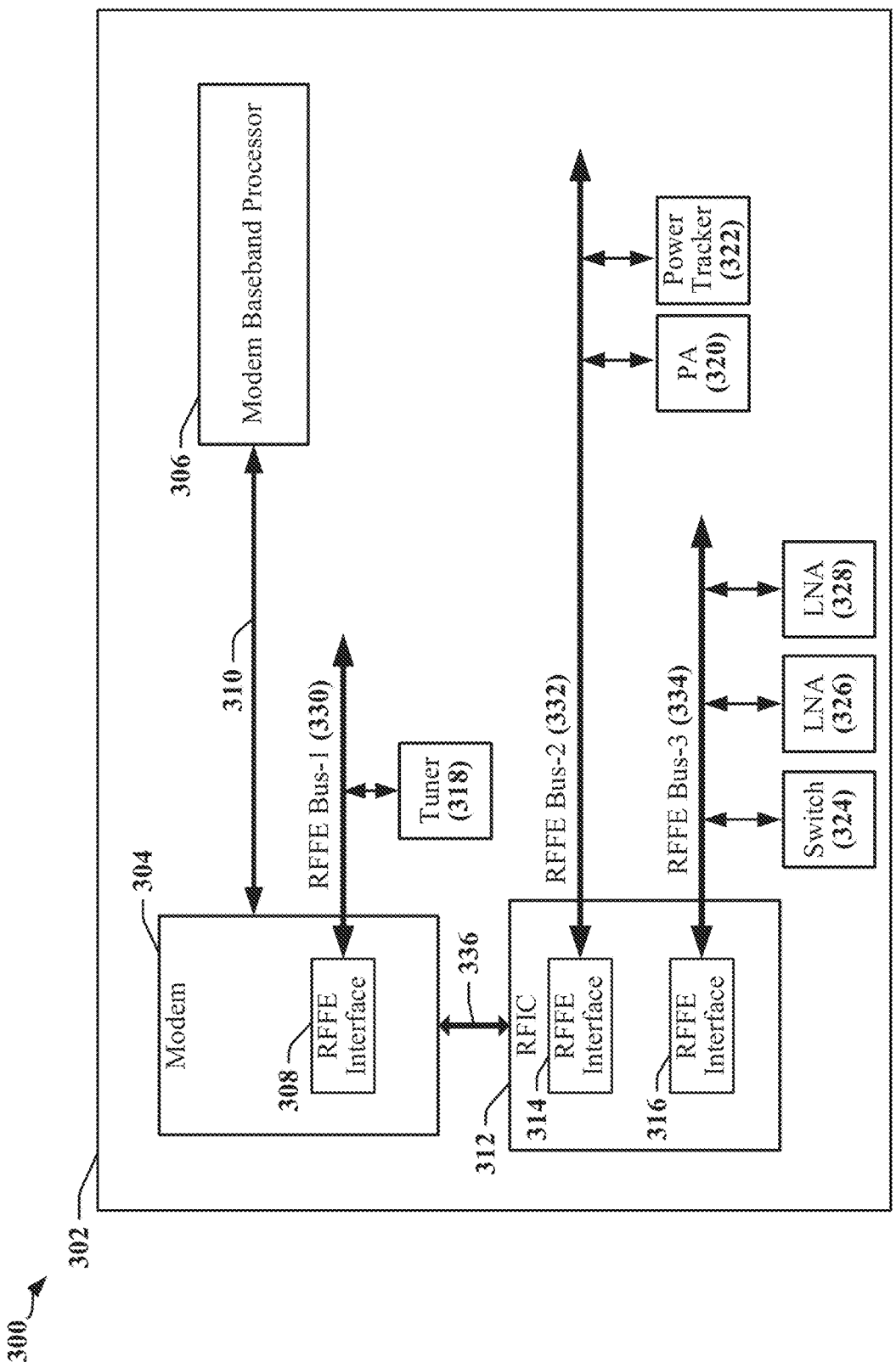
FIG. 3 illustrates a device configuration for coupling various radio frequency front-end devices using multiple RFFE buses.

FIG. 3 is a block diagram 300 illustrating a second example of a configuration of communication links in a chipset or device 302. The device 302 employs multiple RFFE buses 330, 332, 334 to couple various RF front-end devices 318, 320, 322, 324, 326 328. In the illustrated example, a modem 304 includes an RFFE interface 308 that couples the modem 304 to a first RFFE bus 330. The modem 304 may communicate with a baseband processor 306 and an RFIC 312 through one or more communication links 310, 336. The illustrated device 302 may be embodied in one or more of a mobile communication device, a mobile telephone, a mobile computing system, a mobile telephone, a notebook computer, a tablet computing device, a media player, a gaming device, a wearable computing and/or communications device, an appliance, or the like.

In various examples, the device 302 may be implemented with one or more baseband processors 306, modems 304, RFICs 312, multiple communications links 310, 336, multiple RFFE buses 330, 332, 334 and/or other types of buses. The device 302 may include other processors, circuits, modules and may be configured for various operations and/or different functionalities. In the example illustrated in FIG. 3, the modem 304 is coupled to an RF tuner 318 through its RFFE interface 308 and the first RFFE, bus 330. The RFIC 312 may include one or more RFFE interfaces 314, 316, controllers, state machines and/or processors that configure and control certain aspects of the RF front-end. The RFIC 312 may communicate with a PA 320 and a power tracking module 322 through a first of its RFFE interfaces 314 and the second RFFE bus 332. The RFIC 312 may communicate with a switch 324 and one or more LNAs 326, 328.

Figure 4:
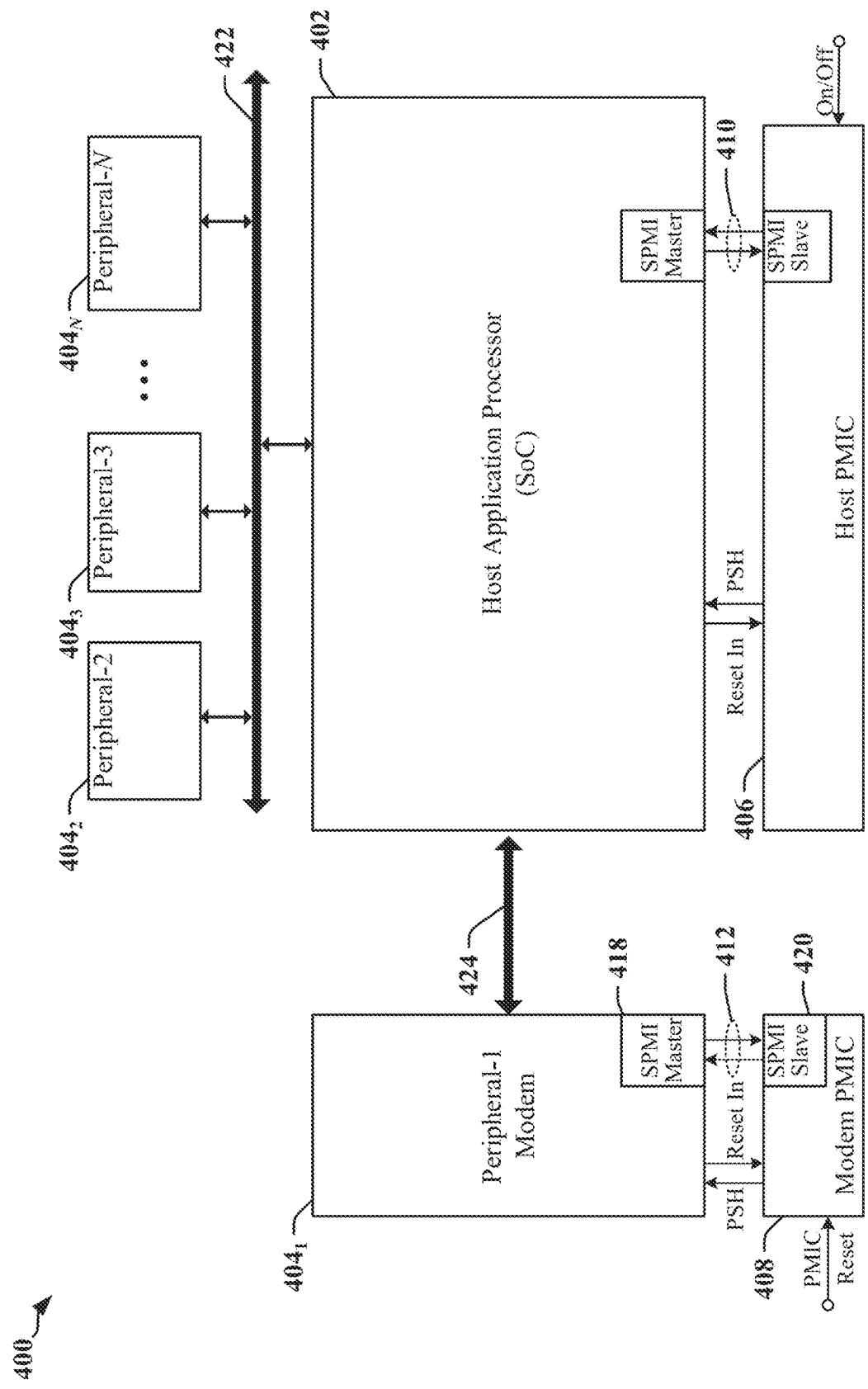
FIG. 4 illustrates a device that employs an SPMI bus to couple various devices in accordance with certain aspects disclosed herein.

The MIPI Alliance system power management interface (SPMI) specifies a hardware interface that may be implemented between baseband or application processors and peripheral components to support a variety of data communication functions including data communication related to power management operations. FIG. 4 illustrates an example of a system 400 which includes data communication links 410, 412, where each of the data communication links 410, 412 is configured as a two-wire serial bus operated in accordance with SPMI protocols. In one example, a first data communication link 410 may be used to connect an integrated power controller of an application processor 402 with a voltage regulation system in a first power management integrated circuit (PMIC 406), and a second data communication link 412 may be used to connect an integrated power controller of a modem $404_1$ with a voltage regulation system in a second PMIC 408. The data communication links 410, 412 can be used to accurately monitor and control processor performance levels required for a given workload or application and dynamically control the various supply voltages in real time based on the performance levels. The data communication links 410, 412 can be used to carry other types of data between the application processor 402 and the first PMIC 406 and/or between the modem $404_1$ and the second PMIC 408. SPMI data communication links may be implemented as multi-drop serial links to connect a variety of different devices and to carry other types of data. Some SPMI data communication links may be optimized for real-time power management functions. Some SPMI data communication links may be may be used as a shared bus that provides high-speed, low-latency connection for devices, where data transmissions may be managed, according to priorities assigned to different traffic classes.

In the system 400 illustrated in FIG. 4, the application processor 402 that may serve as a host device on various data communication links 410, 422, 424 that couple the application processor 402 to the peripherals $404_1$-$404_N$, and one or more PMICs 406. The application processor 402 and the modem $404_1$ may be coupled to respective PMICs 406, 408 using power management interfaces implemented using SPMI masters 414, 418. The SPMI masters 414, 418 communicate with corresponding SPMI slaves 416, 420 provided in the PMICs 406, 408 to facilitate real-time control of the PMICs 406, 408. The application processor 402 may be coupled to each of the peripherals $404_1$-$404_N$ using different types of data communication links 410, 412. For example, the data communication links 410, 412 may be operated in accordance with protocols such as the RFFE, SPMI, I3C protocols.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency may be measured as the time elapsed between a message becoming available for transmission and the delivery of the message or, in some instances, commencement of transmission of the message. Other measures of bus latency may be employed or available to a system designer. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

Diversity Interface

Figure 5:
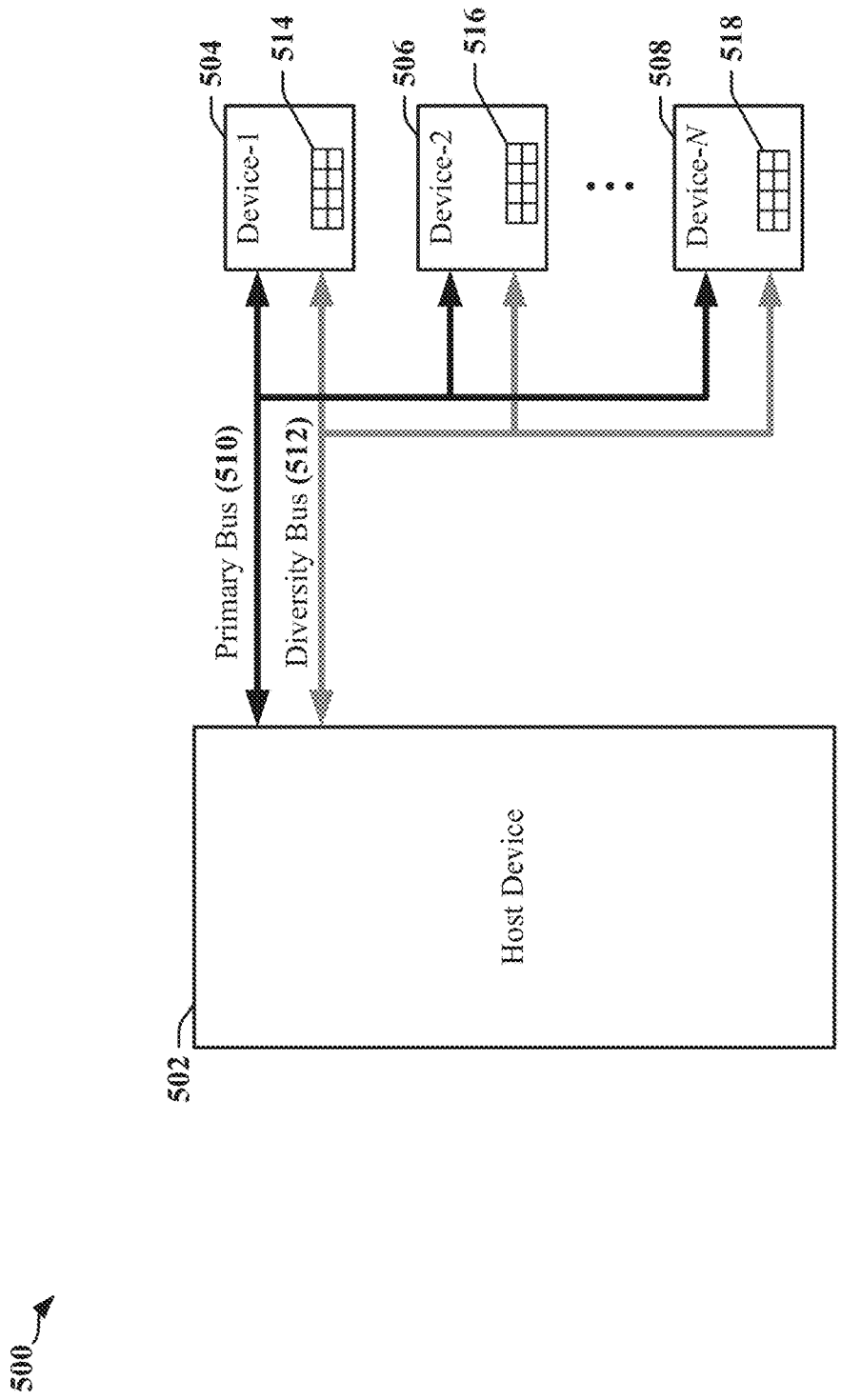
FIG. 5 illustrates a system that includes two serial buses to support low-latency communication between multiple devices in accordance with certain aspects disclosed herein.

Certain concepts disclosed herein provide multiple buses that can be used to communicate low-latency messages between two or more devices. FIG. 5 illustrates a system 500 that includes two serial buses 510, 512 that may be adapted to support low-latency communication between multiple devices 502, 504, 506, 508. A first bus may be designated as a primary serial bus 510, or primary channel, that can be used for communicating low-latency messages, while a second bus may serve as a diversity serial bus 512, or diversity channel, that can provide communication path diversity and/or a backup channel for low-latency communication. The primary serial bus 510 and diversity serial bus 512 may be operated in accordance with the same protocol or different protocols. In the illustrated example, a host device 502 may serve as bus master on at least one of the two serial buses 510, 512, and may control access to one or both serial buses 510, 512. One or more slave devices 504, 506, 508 may be coupled to one or both of the serial buses 510, 512. The number of slave devices 504, 506, 508 that can be coupled to each serial bus 510 or 512 may be limited by the protocol used to operate the serial bus 510 or 512. For example, a maximum of 16 devices can be coupled to a serial bus 510, 512 operated according to an RFFE or SPMI protocol. Each device 504, 506, 508 may be assigned one or more device IDs 514, 516, 518. In some instances, each slave device 504, 506, 508 may be assigned identical IDs for use on two or more serial buses 510, 512.

The host device 502 and one or more slave devices 504, 506, 508 may be configured with two interfaces capable of communicating latency-sensitive messages over one or both of the serial buses 510, 512. In one example, the latency-sensitive messages may include coexistence messages. Coexistence messages are transmitted a multisystem platform to prevent or reduce instances of systems impinging on each other. The system 500 may include multiple instances of certain device types (e.g. switch 324, LNA 326, 328, PA 320 and other types of device) that may operate concurrently in a manner that can generate inter-device interference, or that could potentially cause damage to one or more devices if concurrently active. Devices that may interfere with one another may exchange coexistence management messages to permit each device to signal imminent actions that may result in interference, conflict or damage. Coexistence management messages may be used to manage operation of shared components including a switch 324, LNA 326, 328, PA 320 and/or an antenna.

Low-latency and other messages may be sent through a primary interface and/or a diversity interface. Both interfaces may be active at the same time. Certain components of the system 500 may be configured to identify a latency budget and/or maximum acceptable latency for all possible communications, where the budget and/or link capacity information may be stored in a database that can be accessed in regard to each upcoming transmission. For each upcoming transmission, the system 500 may determine transmission latency expected through the primary and diversity interfaces, and may determine whether a latency violation is expected to occur with respect to the upcoming transmission. Based on analysis of the latency expectations, a transmitter may select the primary or diversity interface for sending the message. The system 500 may provide an alert mechanism for notifying other entities when a latency violation is anticipated.

Figure 6:
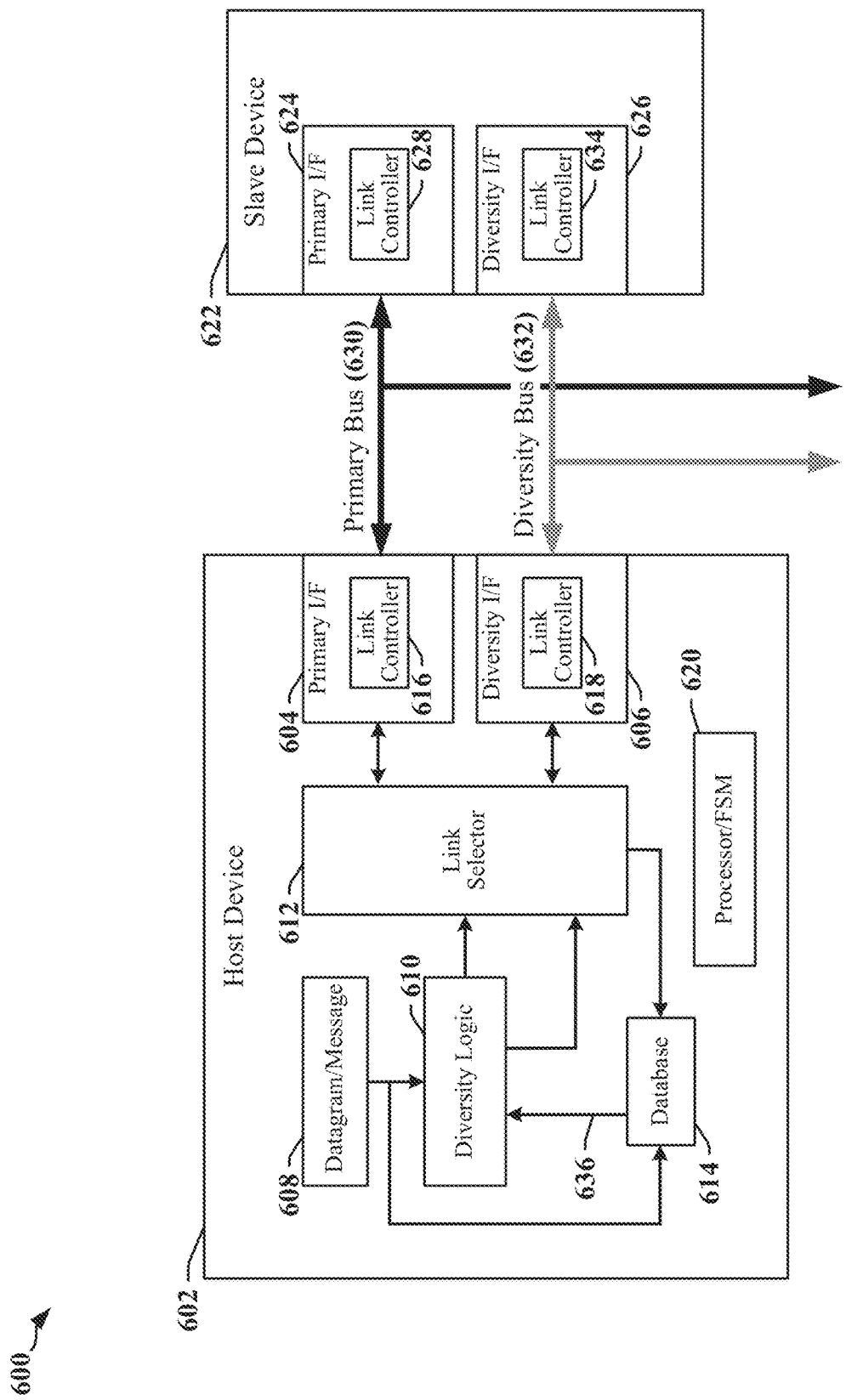
FIG. 6 illustrates certain aspects of a system that provides a primary multi-drop serial bus and a diversity multi-drop serial bus in accordance with certain aspects disclosed herein.

FIG. 6 illustrates certain aspects of a system 600 that provides a primary multi-drop serial bus 630 and a diversity multi-drop serial bus 632. A transmitting device can redirect a message over the diversity multi-drop serial bus 632 when the transmitting device determines that the message cannot be transmitted over the primary multi-drop serial bus 630 while meeting a latency target or requirement.

In the illustrated example, the host device 602 is the transmitting device. In other examples, the slave device 622 may be the transmitting device. The host device 602 includes a primary interface circuit 604 configured to couple the host device 602 to the primary multi-drop serial bus 630 and a diversity interface circuit 606 configured to couple the host device 602 to the diversity multi-drop serial bus 632. Each interface circuit 604, 606 may include transceivers (not shown) coupled to the wires of a respective multi-drop serial bus 630, 632 and a link controller 616, 618 configured to manage and operate a respective interface circuit 604, 606 in accordance with one or more protocols. The interface circuits 604, 606 may be operated in accordance with the same protocol, but need not be operated according to the same protocol. Both interface circuits 604, 606 may be active at the same time. In some implementations, an interface circuit 604, 606 may be unavailable when inactive.

The slave device 622 includes a primary interface circuit 624 configured to couple the slave device 622 to the primary multi-drop serial bus 630 and a diversity interface circuit 626 configured to couple the slave device 622 to the diversity multi-drop serial bus 632. Each interface circuit 624, 626 may include transceivers (not shown) coupled to the wires of a respective multi-drop serial bus 630, 632 and a link controller 628, 634 configured to manage and operate a respective interface circuit 624, 626 in accordance with one or more protocols. The interface circuits 624, 626 may be operated in accordance with the same protocol, but need not be operated according to the same protocol. Both interface circuits 624, 626 may be active at the same time.

The host device 602 may include a processor 620 which may be a microprocessor, microcontroller, finite state machine, sequencer or other device or circuit. The processor 620 may be adapted to manage the operation of the primary interface circuit 604, the diversity interface circuit 606 and diversity logic 610 that causes a link selector 612 to select an interface circuit 604, 606 for transmitting a message to the slave device 622. In some instances, various aspects of the host device 602 operation may be configured, managed or controlled by logic executed in software (soft-logic) by the on-chip processor 620 or by another processing unit provided external to the host device 602. In some examples, communication schemes may be facilitated by an aggregation block implemented using some combination of hardware or software logic.

Data provided to the host device 602 for transmission to the slave device 622 may include data, messages and/or datagrams that can be accumulated in one or more buffers or queues 608. The diversity logic 610 may be configured to determine the priority and latency limits defined for each message for transmission, in addition to other characteristics of the message. The diversity logic 610 may be further configured to determine state of the links between the host device 602 and the slave device 622. The diversity logic 610 may have access to a database system 614 that maintains historical information related to previously-transmitted messages, as well the state of the multi-drop serial buses 630, 632, the interface circuits 604, 606 at the time of transmission of the previously-transmitted messages and outcomes of the transmissions. The database system 614 may maintain outcomes, which may be defined in terms of measured latency and characterized as a "Latency Success" or "Latency Fail." For example, the database system 614 may employ machine learning to provide selection information 636 that can identify historical performance with respect to a targeted latency for each type of message transmitted between the host device 602 and the slave device 622, and for different operating conditions of the primary interface circuit 604 and the diversity interface circuit 606. Based on decisions taken by the diversity logic 610 for previous messages, the diversity logic 610 may cause the link selector 612 to select between the primary interface circuit 604 and the diversity interface circuit 606 to transmit a current message.

In some aspects, a latency budget may be defined for the system 600, for individual transmissions, and/or for one or more of the multi-drop serial buses 630, 632. In one example, the latency budget defines a maximum acceptable latency for all possible messages, including messages of various different sizes, when the messages are transmitted by a transmitter to a receiver. The latency budget may be stored in the database system 614 enabling it to be accessed for each pending transmission. For each transmission, the transmission latency may be determined or estimated for the primary and diversity multi-drop serial buses 630, 632. In one example, the load and/or availability of each multi-drop serial bus 630, 632 may be used to generate a clear interface assessment (CIA). The CIA may indicate whether a latency violation may occur when a pending transmission is transmitted over the primary multi-drop serial bus 630. When a latency violation is expected on the primary multi-drop serial bus 630, the CIA for one or more diversity multi-drop serial buses 632 may be determined. The message may be transmitted over one of the multi-drop serial buses 630, 632, or over a combination of the multi-drop serial buses 630, 632 that can meet the latency budget. In one example, when it is determined that the primary multi-drop serial bus 630 is unavailable, has missed or will miss its latency target, and that the diversity multi-drop serial bus 632 is available and has sufficient capacity to meet the latency target, then the transmitter may switch transmission to the diversity multi-drop serial bus 632. The system may alert other entities that a violation is expected on one or both multi-drop serial buses 630, 632.

The diversity logic 610 may be configured for two or more modes of operation. In a first mode, a predictive latency analysis is performed before the transmission is assigned to the primary interface circuit 604 for transmission. In one example, the predictive latency analysis may produce an estimate of the likelihood that the primary multi-drop serial bus 630, the diversity multi-drop serial bus 632, or some combination of the multi-drop serial buses 630, 632 can complete the transmission within a time limit defined by the latency budget. The predictive latency analysis may be based on knowledge of current and/or ongoing transactions. Information describing the state of the state of the multi-drop serial buses 630, 632 and/or the interface circuits 604 and 606 may be provided to the database system 614 through the link selector 612, and this state information may be reflected in the selection information 636 provided to the diversity logic 610.

Figure 7:
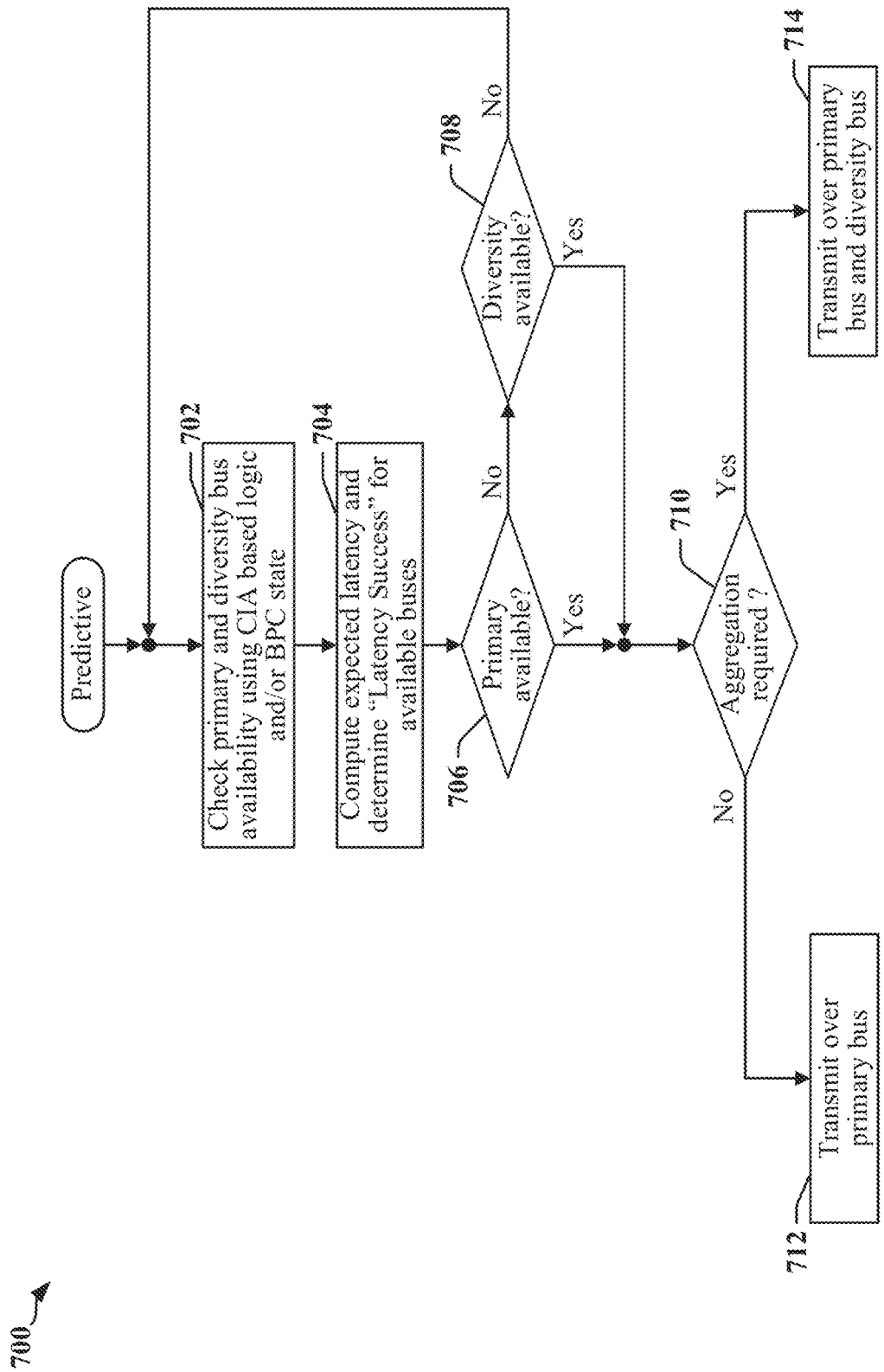
FIG. 7 is a flowchart that illustrates an example of predictive latency analysis in accordance with certain aspects disclosed herein.

FIG. 7 is a flowchart 700 that illustrates an example of predictive latency analysis. The analysis may be implemented in a logic circuit, using a finite state machine and/or a processor in one or more devices coupled to primary multi-drop serial bus 630 and a diversity multi-drop serial bus 632. The analysis may be performed prior to each transmission, where the transmission may include a message or series of messages, and/or control or other information. At block 702, availability of the primary and diversity multi-drop serial buses is checked. A serial bus may be considered available to transmit a low-latency message or datagram when the serial bus is active and likely to transmit the datagram within a time limit defined by the latency budget. In one example, availability may be determined using a "Bus Idle Indicator" that is set and latched when transmissions are terminated using defined termination signaling. When the primary or diversity multi-drop serial bus 630, 632 is operated according to an RFFE or SPMI protocol, the Bus Idle Indicator may be implemented by latching the bus park cycle (BPC). Where available, the Bus Idle Indicator may serve as the CIA. In another example, the primary or diversity multi-drop serial bus 630, 632 may be determined to be unavailable when a latency target is missed during a transmission.

At block 704, Latency Success may be determined by estimating the expected latency associated with the transmission, and then determining the probability that the latency budget defined for the system 600 can be satisfied when the transmission is sent. Latency Success may be determined for the primary and diversity multi-drop serial buses 630, 632 and, in some implementations, Latency Success may be determined when the transmission is sent over a combination of the primary and diversity multi-drop serial buses 630, 632. The transmitting and receiving devices are configured to split and realign portions of the transmission when the transmission is sent over a combination of the primary and diversity multi-drop serial buses 630, 632.

If at block 706, the transmitting device determines that the primary multi-drop serial bus 630 was found to be unavailable, had missed latency target, or unable to satisfy the latency budget, then at block 708 the transmitting device determines that the diversity multi-drop serial bus 632 was found to be unavailable, had missed latency target, or unable to satisfy the latency budget. The analysis may revert to block 702 when neither primary multi-drop serial bus 630 nor the diversity multi-drop serial bus 632 is available or expected to meet latency requirements.

If at block 706, the transmitting device determines that the primary multi-drop serial bus 630 was found to be unavailable, had missed latency target, or unable to satisfy the latency budget, and at block 708 the transmitting device determines that the diversity multi-drop serial bus 632 was found to be available and likely able to satisfy the latency budget, then the transmitting device may switch the transmission to the diversity multi-drop serial bus 632.

If at block 706, the transmitting device determines that the primary multi-drop serial bus 630 was found to be available and likely able to satisfy the latency budget completely or to some degree, the analysis may continue at block 710. At block 710, if the transmitting device has determined that the diversity multi-drop serial bus 632 was found to be available and likely able to satisfy the latency budget to some degree, then the transmitting device may determine whether aggregation is necessary. If aggregation is necessary, then at block 714 the transmitting device may send the transmission over both the primary multi-drop serial bus 630 and the diversity multi-drop serial bus 632. If aggregation is unnecessary, then at block 712 the transmitting device may send the transmission over the primary multi-drop serial bus 630.

In certain implementations, the transmitting device may aggregate available bandwidth of the primary multi-drop serial bus 630 with the available bandwidth of the diversity multi-drop serial bus 632 to satisfy compliance with the latency budget. The transmitting device may split a transmission into portions that can be separately and/or concurrently transmitted over the primary multi-drop serial bus 630 and the diversity multi-drop serial bus 632. The transmitting device may transmit identifiers with the portions that enable the receiving device to reassemble the transmission from the portions received from the primary multi-drop serial bus 630 and the diversity multi-drop serial bus 632. In one example, a transmission may include a plurality of datagrams and transmitting device may split the transmission into a first set of datagrams assigned for transmission over the primary multi-drop serial bus 630 and second set of datagrams assigned for transmission over the diversity multi-drop serial bus 632. Each datagram may be transmitted with an identifier that enables the receiving device to identify its relationship to other datagrams in the transmission. In other examples, the transmission may be split into smaller datagrams or transmission units. The transmitting device may divide portions of the transmission between the primary multi-drop serial bus 630 and the diversity multi-drop serial bus 632 based on current bus conditions and latency requirements.

According to certain aspects, a transmission may be assigned a high-priority access indicator when transferred from the primary multi-drop serial bus 630 to the diversity multi-drop serial bus 632. The high-priority access indicator may be referred to as a "Gold Pass" or "Magic ID" that causes the link controller 618 of the diversity interface circuit 606 to process a transferred transmission with a highest available priority. The high-priority access indicator may be operable for a point-to-point datalink or a shared multi-drop serial bus 632. In one example, the high-priority access indicator may be used to increase priority of the transmitting device in a bus arbitration process. In another example, the high-priority access indicator may increase the queue priority of the transmission within the transmitting device. In some instances, the high-priority access indicator may assign one of multiple possible priority levels to the transmission.

In certain implementations, the results of the predictive latency analysis may be provided to the database system 614, which may store the context, interface status and results of the analysis for purposes of machine learning and to guide future analyses. In one example, latency success, diversity selection and/or operation may be used to guide analysis in future transactions.

Figure 8:
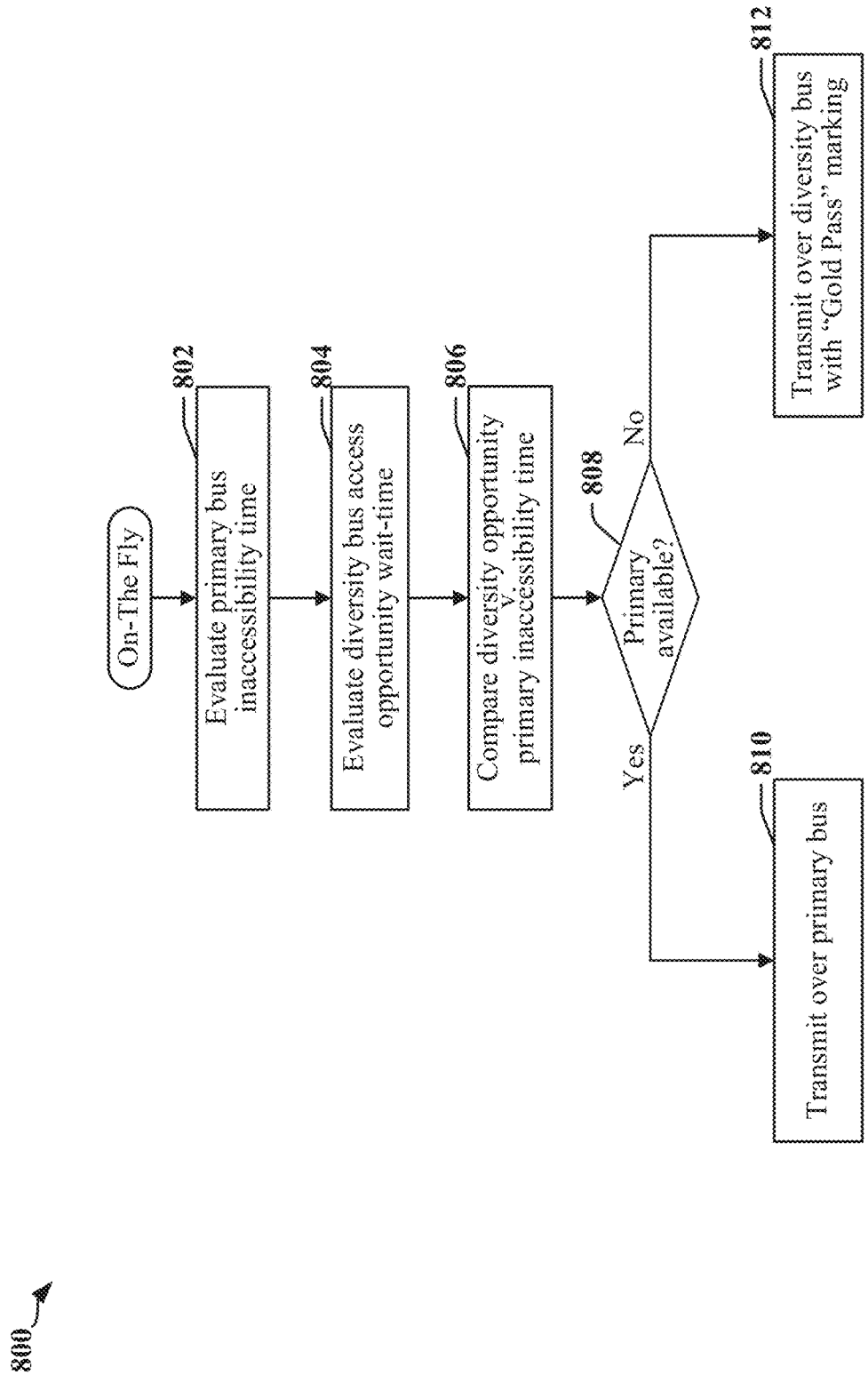
FIG. 8 is a flowchart that illustrates an example of on-the-fly latency analysis in accordance with certain aspects disclosed herein.

In a second mode, an on-the-fly latency analysis may be performed in real-time. FIG. 8 is a flowchart 800 that illustrates an example of on-the-fly latency analysis. The analysis may be implemented in a logic circuit, using a finite state machine and/or a processor in one or more devices coupled to primary multi-drop serial bus 630 and a diversity multi-drop serial bus 632. The analysis may be performed during active transmission of each datagram over the primary multi-drop serial bus 630. In some instances, the on-the-fly latency analysis and predictive latency analysis may be performed concurrently.

At block 802, the inaccessibility time for the primary multi-drop serial bus 630 is evaluated, and the availability of the diversity multi-drop serial bus 632 is evaluated at block 804. In one example, the inaccessibility time may correspond to the length of time for which the primary multi-drop serial bus 630 has been unavailable for transmission of the datagram. In another example, availability may be indicative of an opportunity for transmitting the datagram by the diversity multi-drop serial bus 632. A serial bus may be considered available to transmit a low-latency message or datagram when the serial bus is active and likely to transmit the datagram within a time limit defined by the latency budget.

At block 806, the inaccessibility time and availability may be compared and/or evaluated. The comparison or evaluation may relate to probability that the respective multi-drop serial buses 630, 632 can communicate the datagram within the limits set by the latency budget. In one example, the transmitting device may determine that the primary multi-drop serial bus 630 is unavailable when it has reached or exceeded a maximum inaccessibility time.

If at block 808 the transmitting device determines that the multi-drop serial bus 630 is unavailable and that the diversity multi-drop serial bus 632 is available, then the datagram may be transferred at block 812 to the diversity interface circuit 606 for transmission over the diversity multi-drop serial bus 632. Otherwise, the primary interface circuit 606 transmits the datagram at block 810.

When the diversity multi-drop serial bus 632 meets the latency requirements, a transaction moved to the diversity interface circuit 606 may be assigned a high-priority access indicator when transferred from the primary multi-drop serial bus 630 to the diversity multi-drop serial bus 632. The high-priority access indicator may be referred to as a "Gold Pass" or "Magic ID" that causes the link controller 618 of the diversity interface circuit 606 to process a transferred transmission with a highest available priority. The high-priority access indicator may be operable for a point-to-point datalink or a shared multi-drop serial bus 632. In one example, the high-priority access indicator may be used to increase priority of the transmitting device in a bus arbitration process. In another example, the high-priority access indicator may increase the queue priority of the transmission within the transmitting device. In some instances, the high-priority access indicator may assign one of multiple possible priority levels to the transmission.

Examples of Processing Circuits and Methods

Figure 9:
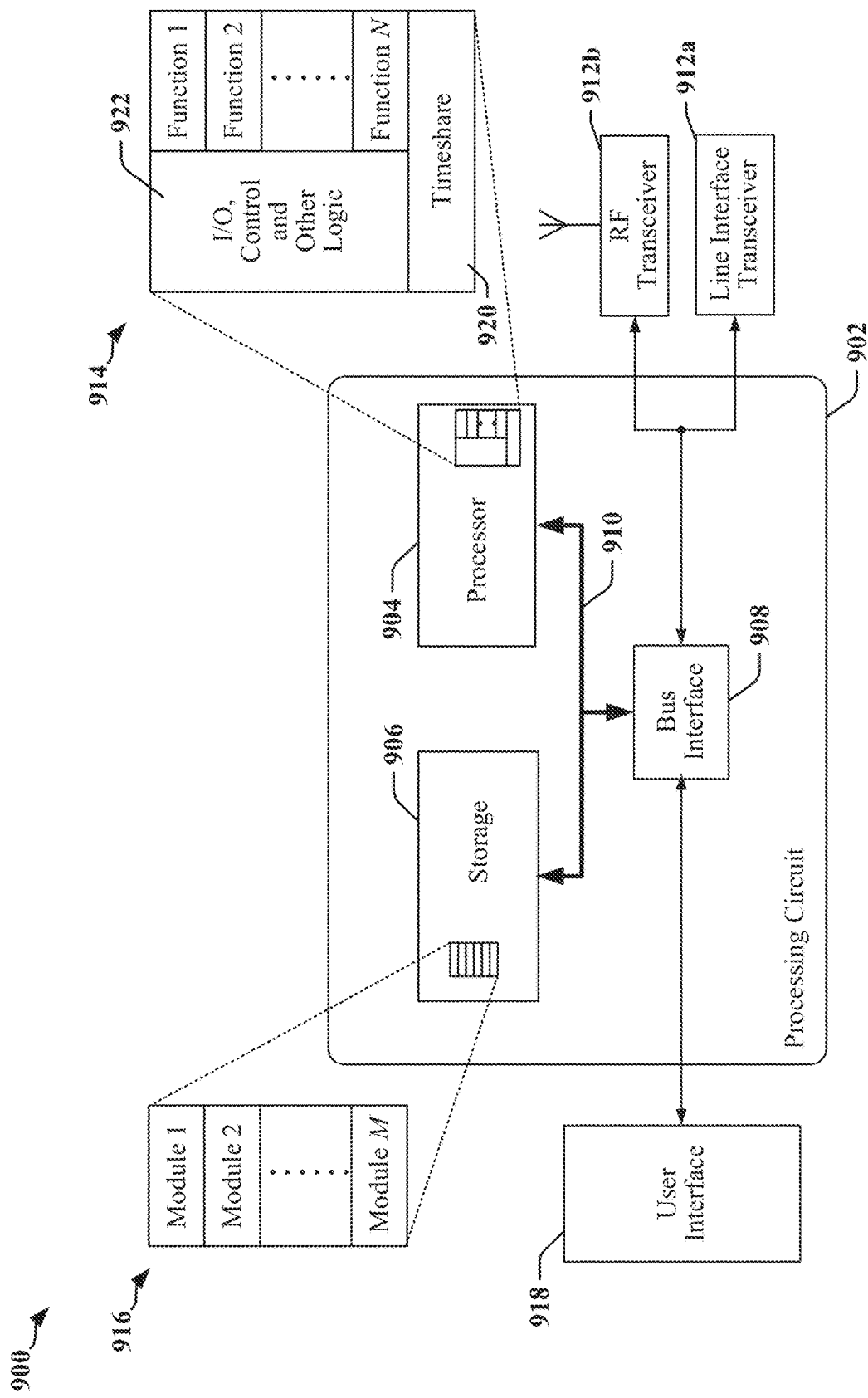
FIG. 9 illustrates one example of an apparatus employing a processing circuit that may be adapted according to certain aspects disclosed herein.

FIG. 9 is a diagram illustrating an example of a hardware implementation for an apparatus 900. In some examples, the apparatus 900 may perform one or more functions disclosed herein. In accordance with various aspects of the disclosure, an element, or any portion of an element, or any combination of elements as disclosed herein may be implemented using a processing circuit 902. The processing circuit 902 may include one or more processors 904 that are controlled by some combination of hardware and software modules. Examples of processors 904 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 904 may include specialized processors that perform specific functions, and that may be configured, augmented or controlled by one of the software modules 916. The one or more processors 904 may be configured through a combination of software modules 916 loaded during initialization, and further configured by loading or unloading one or more software modules 916 during operation.

In the illustrated example, the processing circuit 902 may be implemented with a bus architecture, represented generally by the bus 910. The bus 910 may include any number of interconnecting buses and bridges depending on the specific application of the processing circuit 902 and the overall design constraints. The bus 910 links together various circuits including the one or more processors 904, and storage 906. Storage 906 may include memory devices and mass storage devices, and may be referred to herein as computer-readable media and/or processor-readable media. The bus 910 may also link various other circuits such as timing sources, timers, peripherals, voltage regulators, and power management circuits. A bus interface 908 may provide an interface between the bus 910 and one or more transceivers 912*a*, 912*b*. A transceiver 912*a*, 912*b* may be provided for each networking technology supported by the processing circuit. In some instances, multiple networking technologies may share some or all of the circuitry or processing modules found in a transceiver 912*a*, 912*b*. Each transceiver 912*a*, 912*b* provides a means for communicating with various other apparatus over a transmission medium. In one example, a transceiver 912*a* may be used to couple the apparatus 900 to a multi-wire bus. In another example, a transceiver 912*b* may be used to connect the apparatus 900 to a radio access network. Depending upon the nature of the apparatus 900, a user interface 918 (e.g., keypad, display, speaker, microphone, joystick) may also be provided, and may be communicatively coupled to the bus 910 directly or through the bus interface 908.

A processor 904 may be responsible for managing the bus 910 and for general processing that may include the execution of software stored in a computer-readable medium that may include the storage 906. In this respect, the processing circuit 902, including the processor 904, may be used to implement any of the methods, functions and techniques disclosed herein. The storage 906 may be used for storing data that is manipulated by the processor 904 when executing software, and the software may be configured to implement any one of the methods disclosed herein.

One or more processors 904 in the processing circuit 902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 906 or in an external computer-readable medium. The external computer-readable medium and/or storage 906 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 906 may also include, by way of example, a carrier wave, a transmission line, and any other suitable medium for transmitting software and/or instructions that may be accessed and read by a computer. Computer-readable medium and/or the storage 906 may reside in the processing circuit 902, in the processor 904, external to the processing circuit 902, or be distributed across multiple entities including the processing circuit 902. The computer-readable medium and/or storage 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 906 may maintain software maintained and/or organized in loadable code segments, modules, applications, programs, etc., which may be referred to herein as software modules 916. Each of the software modules 916 may include instructions and data that, when installed or loaded on the processing circuit 902 and executed by the one or more processors 904, contribute to a run-time image 914 that controls the operation of the one or more processors 904. When executed, certain instructions may cause the processing circuit 902 to perform functions in accordance with certain methods, algorithms and processes described herein.

Some of the software modules 916 may be loaded during initialization of the processing circuit 902, and these software modules 916 may configure the processing circuit 902 to enable performance of the various functions disclosed herein. For example, some software modules 916 may configure internal devices and/or logic circuits 922 of the processor 904, and may manage access to external devices such as a transceiver 912*a*, 912*b*, the bus interface 908, the user interface 918, timers, mathematical coprocessors, and so on. The software modules 916 may include a control program and/or an operating system that interacts with interrupt handlers and device drivers, and that controls access to various resources provided by the processing circuit 902. The resources may include memory, processing time, access to a transceiver 912*a*, 912*b*, the user interface 918, and so on.

One or more processors 904 of the processing circuit 902 may be multifunctional, whereby some of the software modules 916 are loaded and configured to perform different functions or different instances of the same function. The one or more processors 904 may additionally be adapted to manage background tasks initiated in response to inputs from the user interface 918, the transceiver 912*a*, 912*b*, and device drivers, for example. To support the performance of multiple functions, the one or more processors 904 may be configured to provide a multitasking environment, whereby each of a plurality of functions is implemented as a set of tasks serviced by the one or more processors 904 as needed or desired. In one example, the multitasking environment may be implemented using a timesharing program 920 that passes control of a processor 904 between different tasks, whereby each task returns control of the one or more processors 904 to the timesharing program 920 upon completion of any outstanding operations and/or in response to an input such as an interrupt. When a task has control of the one or more processors 904, the processing circuit is effectively specialized for the purposes addressed by the function associated with the controlling task. The timesharing program 920 may include an operating system, a main loop that transfers control on a round-robin basis, a function that allocates control of the one or more processors 904 in accordance with a prioritization of the functions, and/or an interrupt driven main loop that responds to external events by providing control of the one or more processors 904 to a handling function.

Methods for optimizing virtual GPIO latency may include an act of parsing various input sources including sources of GPIO signal state, parameters and/or messages to be transmitted. The input sources may include hardware events, configuration data, mask parameters, and register addresses. Packet-specific latency estimators may be employed to estimate the latency for corresponding packet types based upon the parsed parameters. A packet type to be used for transmission may be selected based on the minimum latency calculated or determined for available packet types. The selected packet type may be identified using a command code, which may be provided to a packetizer with a payload to be transmitted. The command code may also reflect a protocol to be used to transmit the payload. In some implementations, the physical link used to transmit the payload may be operated according to different protocols or different variants of one or more protocols. The protocol to be used for transmitting the payload may be selected based on latencies associated with the various available protocols or variants of protocols.

Figure 10:
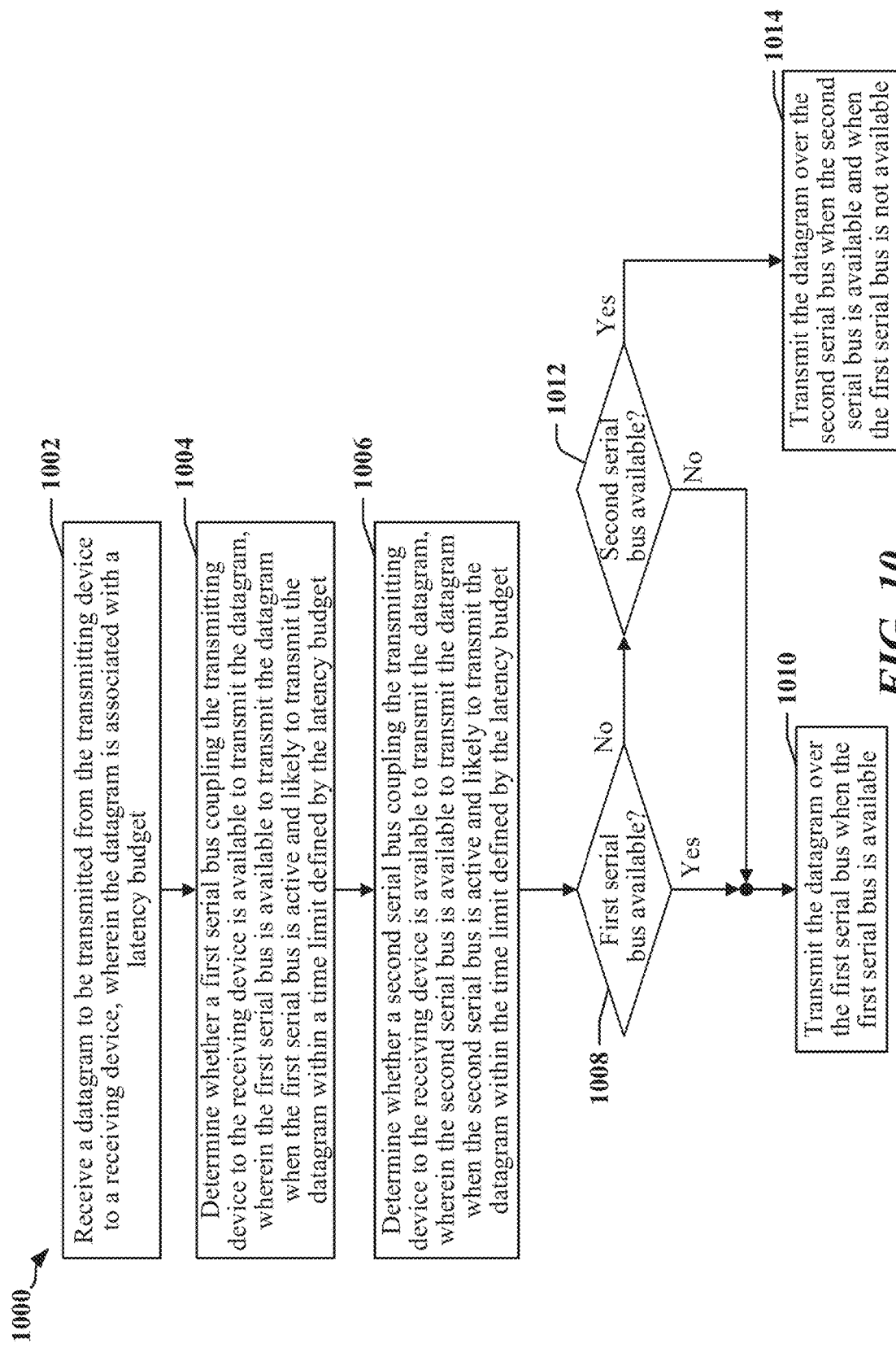
FIG. 10 is a flowchart that illustrates certain aspects disclosed herein.

FIG. 10 is a flowchart 1000 of a method that may be performed by a transmitting device coupled to one or more serial buses. Each serial bus may be operated in accordance with an I3C, RFFE, SPMI or other protocol. The serial buses may be operated in accordance with the same protocol or different protocols.

At block 1002, the transmitting device may receive a datagram to be transmitted from the transmitting device to a receiving device. The datagram may be associated with a latency budget.

At block 1004, the transmitting device may determine whether a first serial bus coupling the transmitting device to the receiving device is available to transmit the datagram.

At block 1006, the transmitting device may determine whether a second serial bus coupling the transmitting device to the receiving device is available to transmit the datagram.

If at block 1008, the transmitting device has determined that the first serial bus is available, the transmitting device may transmit the datagram over the first serial bus at block 1010. If at block 1008, the transmitting device has determined that the first serial bus is not available, the method may continue at block 1012.

If at block 1012, the transmitting device has determined that the second serial bus is available, the transmitting device may transmit the datagram over the second serial bus at block 1014. If at block 1012, the transmitting device has determined that the second serial bus is not available, the transmitting device may transmit the datagram over the first serial bus at block 1010.

In one example, the datagram is one of a plurality of datagrams in a transaction conducted between the transmitting device and the receiving device. The transmitting device may transmit a first portion of the plurality of datagrams over the first serial bus and a second portion of the plurality of datagrams over the second serial bus when the first serial bus is available and the second serial bus is available. The transmitting device may identify the first portion of the plurality of datagrams using one or more first identifiers transmitted over the first serial bus. The transmitting device may identify the second portion of the plurality of datagrams using one or more second identifiers transmitted over the second serial bus. The first serial bus may be determined to be available when a latched bus park cycle is detected by the transmitting device.

In certain examples, the first serial bus is available to transmit the datagram when the first serial bus is active and likely to transmit the datagram within a time limit defined by the latency budget. The second serial bus is available to transmit the datagram when the second serial bus is active and likely to transmit the datagram within the time limit defined by the latency budget. The transmitting device may transmit the datagram over the second serial bus when the second serial bus is active and likely to transmit the datagram within the time limit defined by the latency budget, and when the first serial bus is not active or not expected to transmit the datagram within the time limit defined by the latency budget. In some instances, the datagram is one of a plurality of datagrams in a transaction conducted between the transmitting device and the receiving device, and the transmitting device may transmit a first portion of the plurality of datagrams over the first serial bus and a second portion of the plurality of datagrams over the second serial bus when the first serial bus is active but not expected to transmit the datagram within the time limit set by the latency budget and the second serial bus is active. The first portion of the plurality of datagrams may be identified using one or more first identifiers transmitted over the first serial bus. The second portion of the plurality of datagrams may be identified using one or more second identifiers transmitted over the second serial bus.

In some examples, the first serial bus is determined to be unavailable when transmission of the datagram fails to satisfy the time limit set by the latency budget.

In certain examples, the transmitting device may estimate a first expected latency for transmitting the datagram based on transactions that are ongoing or queued for the first serial bus and determine that the datagram can be transmitted over the first serial bus within the time limit set by the latency budget when the first expected latency is less than the time limit set by the latency budget. The transmitting device may estimate a second expected latency for transmitting the datagram based on transactions that are ongoing or queued for the second serial bus and determine that the datagram can be transmitted over the second serial bus within the time limit set by the latency budget when the second expected latency is less than the time limit set by the latency budget. The first expected latency and the second expected latency may be determined using a history of prior transmissions and associated latencies.

The first serial bus may be operated in accordance with a first protocol and the second serial bus may be operated in accordance with a second protocol that is different from the first protocol. The first serial bus and second serial bus may be operated in accordance with the same protocol. The first serial bus or the second serial bus may be operated in accordance with an I3C, RFFE, SPMI or other serial protocol. The first serial bus or the second serial bus may be configured as a point-to-point link. In some examples, the first serial bus or the second serial bus may be implemented using UARTs.

Figure 11:
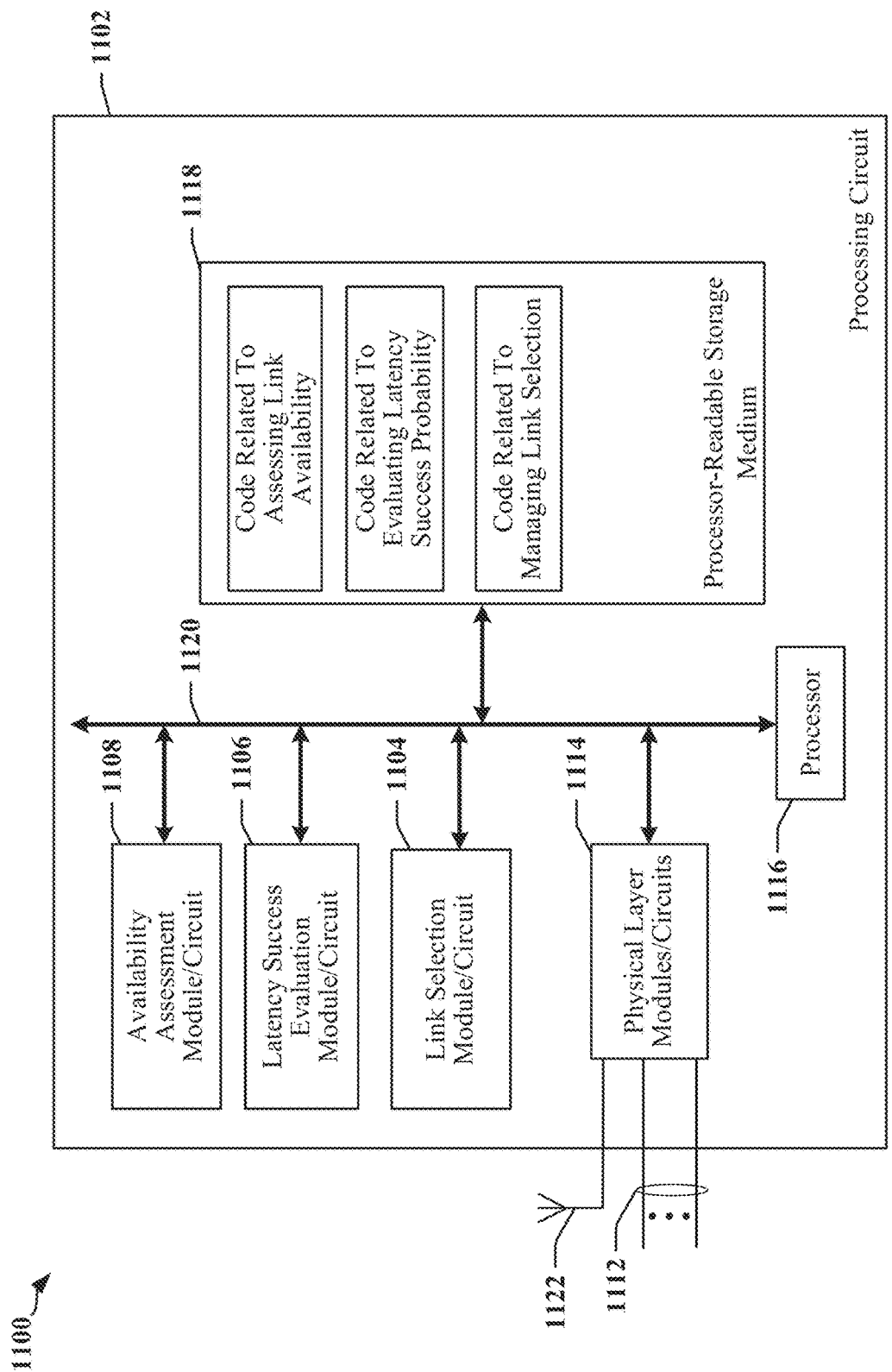
FIG. 11 illustrates an example of a hardware implementation for an apparatus adapted in accordance with certain aspects disclosed herein.

FIG. 11 is a diagram illustrating a simplified example of a hardware implementation for an apparatus 1100 employing a processing circuit 1102. The processing circuit typically has a controller or processor 1116 that may include one or more microprocessors, microcontrollers, digital signal processors, sequencers and/or state machines. The processing circuit 1102 may be implemented with a bus architecture, represented generally by the bus 1120. The bus 1120 may include any number of interconnecting buses and bridges depending on the specific application of the processing circuit 1102 and the overall design constraints. The bus 1120 links together various circuits including one or more processors and/or hardware modules, represented by the controller or processor 1116, the modules or circuits 1104, 1106 and 1108 and the processor-readable storage medium 1118. One or more physical layer circuits and/or modules 1114 may be provided to support communication over a communication link implemented using a plurality of serial buses 1112, through an antenna 1122 (to a radio access network for example), and so on. The bus 1120 may also link various other circuits such as timing sources, peripherals, voltage regulators, and power management circuits, which are well known in the art, and therefore, will not be described any further.

The processor 1116 is responsible for general processing, including the execution of software, code and/or instructions stored on the processor-readable storage medium 1118. The processor-readable storage medium may include a non-transitory storage medium. The software, when executed by the processor 1116, causes the processing circuit 1102 to perform the various functions described supra for any particular apparatus. The processor-readable storage medium may be used for storing data that is manipulated by the processor 1116 when executing software. The processing circuit 1102 further includes at least one of the modules 1104, 1106 and 1108. The modules 1104, 1106 and 1108 may be software modules running in the processor 1116, resident/stored in the processor-readable storage medium 1118, one or more hardware modules coupled to the processor 1116, or some combination thereof. The modules 1104, 1106 and 1108 may include microcontroller instructions, state machine configuration parameters, or some combination thereof.

In one configuration, the apparatus 1100 includes modules and/or circuits 1108 adapted to determine availability of one or more serial buses, modules and/or circuits 1106 adapted to evaluate likelihood that a transmission can be sent over the one or more serial buses while satisfying a latency budget, modules and/or circuits 1104 adapted to select one of the one or more serial buses to handle the transmission.

In one example, the apparatus 1100 includes a transmitting device. The physical layer circuits and/or modules 1114 of the apparatus 1100 may implement an interface circuit adapted to couple the apparatus 1100 to a plurality of serial buses 1112, including a first serial bus and a second serial bus. The first serial bus is operated in accordance with a first protocol and the second serial bus is operated in accordance with a second protocol that is different from the first protocol. The apparatus 1100 may have a first device coupled to a first serial bus of the plurality of serial buses through a first interface and coupled to the second serial bus of the plurality of serial buses through a second interface, and a second device coupled to the first serial bus and the second serial bus. The first device may be configured to receive a datagram to be transmitted from the transmitting device to a receiving device. The datagram may be associated with a latency budget. The first device may be configured to determine whether the first serial bus is available to transmit the datagram, determine whether the second serial bus is available to transmit the datagram, transmit the datagram over the first serial bus when the first serial bus is available, and transmit the datagram over the second serial bus when the second serial bus is available and when the first serial bus is not available. The first device may be configured to transmit the datagram over the first serial bus when the second serial bus is not available.

The datagram may be one of a plurality of datagrams in a transaction conducted between the transmitting device and the receiving device. The first device may be further configured to transmit a first portion of the plurality of datagrams over the first serial bus and a second portion of the plurality of datagrams over the second serial bus when the first serial bus is available and the second serial bus is available.

The first serial bus may be determined to be available when a latched bus park cycle is detected by the transmitting device. The first serial bus may be available to transmit the datagram when the first serial bus is active and likely to transmit the datagram within a time limit defined by the latency budget. The second serial bus may be available to transmit the datagram when the second serial bus is active and likely to transmit the datagram within the time limit defined by the latency budget. The first device may be configured to transmit the datagram over the second serial bus when the second serial bus is active and likely to transmit the datagram within the time limit defined by the latency budget, and when the first serial bus is not active or not expected to transmit the datagram within the time limit defined by the latency budget.

The datagram may be one of a plurality of datagrams in a transaction conducted between the transmitting device and the receiving device and the first device may be further configured to transmit a first portion of the plurality of datagrams over the first serial bus and a second portion of the plurality of datagrams over the second serial bus when the first serial bus is active but not expected to transmit the datagram within the time limit set by the latency budget and the second serial bus is active.

The first serial bus may be determined to be unavailable when transmission of the datagram fails to satisfy the time limit set by the latency budget.

The first device may be further configured to estimate a first expected latency for transmitting the datagram based on transactions that are ongoing or queued for the first serial bus, determine that the datagram can be transmitted over the first serial bus within the time limit set by the latency budget when the first expected latency is less than the time limit set by the latency budget, estimate a second expected latency for transmitting the datagram based on transactions that are ongoing or queued for the second serial bus, and determine that the datagram can be transmitted over the second serial bus within the time limit set by the latency budget when the second expected latency is less than the time limit set by the latency budget. The first expected latency and the second expected latency may be determined using a history of prior transmissions and associated latencies.

The processor-readable storage medium 1118 may include transitory or non-transitory storage devices configured to store code, instructions and/or parameters used to implement one or more methods or procedures disclosed herein. The processor-readable storage medium 1118 may include code for receiving a datagram to be transmitted from the transmitting device to a receiving device. The datagram may be associated with a latency budget. The processor-readable storage medium 1118 may include code for determining whether a first serial bus coupling the transmitting device to the receiving device is available to transmit the datagram, determining whether a second serial bus coupling the transmitting device to the receiving device is available to transmit the datagram, transmitting the datagram over the first serial bus when the first serial bus is available, and transmitting the datagram over the second serial bus when the second serial bus is available and when the first serial bus is unavailable.

The datagram may be one of a plurality of datagrams in a transaction conducted between the transmitting device and the receiving device, and the processor-readable storage medium 1118 may include code for transmitting a first portion of the plurality of datagrams over the first serial bus and a second portion of the plurality of datagrams over the second serial bus when the first serial bus is available and the second serial bus is available.

The first serial bus may be available to transmit the datagram when the first serial bus is active and likely to transmit the datagram within a time limit defined by the latency budget. The second serial bus may be available to transmit the datagram when the second serial bus is active and likely to transmit the datagram within the time limit defined by the latency budget. The processor-readable storage medium 1118 may include code for transmitting the datagram over the second serial bus when the second serial bus is active and likely to transmit the datagram within the time limit defined by the latency budget, and when the first serial bus is not active or not expected to transmit the datagram within the time limit defined by the latency budget.

The first serial bus may be determined to be unavailable when transmission of the datagram fails to satisfy the time limit set by the latency budget.

The processor-readable storage medium 1118 may include code for estimating a first expected latency for transmitting the datagram based on transactions that are ongoing or queued for the first serial bus, determining that the datagram can be transmitted over the first serial bus within the time limit set by the latency budget when the first expected latency is less than the time limit set by the latency budget, estimating a second expected latency for transmitting the datagram based on transactions that are ongoing or queued for the second serial bus, and determining that the datagram can be transmitted over the second serial bus within the time limit set by the latency budget when the second expected latency is less than the time limit set by the latency budget. The first expected latency and the second expected latency may be determined using a history of prior transmissions and associated latencies.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of data communications at a transmitting device, comprising:
   receiving a datagram to be transmitted from the transmitting device to a receiving device, wherein the datagram is associated with a latency budget;
   determining whether a first serial bus coupling the transmitting device to the receiving device is available to transmit the datagram, wherein the first serial bus is available to transmit the datagram when the first serial bus is active and likely to transmit the datagram within a time limit defined by the latency budget;
   determining whether a second serial bus coupling the transmitting device to the receiving device is available to transmit the datagram, wherein the second serial bus is available to transmit the datagram when the second serial bus is active and likely to transmit the datagram within the time limit defined by the latency budget;
   transmitting the datagram over the first serial bus when the first serial bus is available; and
   transmitting the datagram over the second serial bus when the second serial bus is available and when the first serial bus is not available.

2. The method of claim 1, further comprising:
   transmitting the datagram over the first serial bus when the second serial bus is unavailable.

3. The method of claim 1, wherein the datagram is one of a plurality of datagrams in a transaction conducted between the transmitting device and the receiving device, further comprising:
   transmitting a first portion of the plurality of datagrams over the first serial bus while concurrently transmitting a second portion of the plurality of datagrams over the second serial bus when the first serial bus is available and when the second serial bus is available.

4. The method of claim 1, wherein the first serial bus is determined to be available when a latched bus park cycle is detected by the transmitting device.

5. The method of claim 1, further comprising:
   transmitting the datagram over the second serial bus when the second serial bus is available, and when the first serial bus is not active or not expected to transmit the datagram within the time limit defined by the latency budget.

6. The method of claim 1, further comprising:
   estimating a first expected latency for transmitting the datagram based on transactions that are ongoing or queued for the first serial bus;
   determining that the datagram can be transmitted over the first serial bus within the time limit defined by the latency budget when the first expected latency is less than the time limit defined by the latency budget;
   estimating a second expected latency for transmitting the datagram based on transactions that are ongoing or queued for the second serial bus; and
   determining that the datagram can be transmitted over the second serial bus within the time limit defined by the latency budget when the second expected latency is less than the time limit defined by the latency budget.

7. The method of claim 1, wherein the first serial bus is operated in accordance with a first protocol and the second serial bus is operated in accordance with a second protocol that is different from the first protocol.

8. The method of claim 3, further comprising:
   identifying the first portion of the plurality of datagrams using one or more first identifiers transmitted over the first serial bus; and
   identifying the second portion of the plurality of datagrams using one or more second identifiers transmitted over the second serial bus.

9. The method of claim 5, wherein the datagram is one of a plurality of datagrams in a transaction conducted between the transmitting device and the receiving device, further comprising:
   transmitting a first portion of the plurality of datagrams over the first serial bus and a second portion of the plurality of datagrams over the second serial bus when the first serial bus is active but not expected to transmit the datagram within the time limit defined by the latency budget and the second serial bus is active.

10. The method of claim 6, wherein the first expected latency and the second expected latency are determined using a history of prior transmissions and associated latencies.

11. An apparatus comprising:
    a plurality of serial buses;
    a first device coupled to a first serial bus of the plurality of serial buses through a first interface and coupled to a second serial bus of the plurality of serial buses through a second interface; and
    a second device coupled to the first serial bus and the second serial bus,
    wherein the first device is configured to:
       receive a datagram to be transmitted from the first device to the second device, wherein the datagram is associated with a latency budget;
       determine whether the first serial bus is available to transmit the datagram, wherein the first serial bus is available to transmit the datagram when the first serial bus is active and likely to transmit the datagram within a time limit defined by the latency budget;
       determine whether the second serial bus is available to transmit the datagram, wherein the second serial bus is available to transmit the datagram when the second serial bus is active and likely to transmit the datagram within the time limit defined by the latency budget;
       transmit the datagram over the first serial bus when the first serial bus is available; and
       transmit the datagram over the second serial bus when the second serial bus is available and when the first serial bus is not available.

12. The apparatus of claim 11, wherein the first device is further configured to:
    transmit the datagram over the first serial bus when the second serial bus is unavailable.

13. The apparatus of claim 11, wherein the datagram is one of a plurality of datagrams in a transaction conducted between the first device and the second device, and wherein the first device is further configured to:
    transmit a first portion of the plurality of datagrams over the first serial bus while concurrently transmitting a second portion of the plurality of datagrams over the second serial bus when the first serial bus is available and when the second serial bus is available.

14. The apparatus of claim 11, wherein the first serial bus is determined to be available when a latched bus park cycle is detected by the first device.

15. The apparatus of claim 11, wherein the first device is further configured to:
   transmit the datagram over the second serial bus when the second serial bus is available, and when the first serial bus is not active or not expected to transmit the datagram within the time limit defined by the latency budget.

16. The apparatus of claim 11, wherein the first device is further configured to:
   estimate a first expected latency for transmitting the datagram based on transactions that are ongoing or queued for the first serial bus;
   determine that the datagram can be transmitted over the first serial bus within the time limit defined by the latency budget when the first expected latency is less than the time limit defined by the latency budget;
   estimate a second expected latency for transmitting the datagram based on transactions that are ongoing or queued for the second serial bus; and
   determine that the datagram can be transmitted over the second serial bus within the time limit defined by the latency budget when the second expected latency is less than the time limit defined by the latency budget.

17. The apparatus of claim 11, wherein the first serial bus is operated in accordance with a first protocol and the second serial bus is operated in accordance with a second protocol that is different from the first protocol.

18. The apparatus of claim 13, wherein the first device is further configured to:
   identify the first portion of the plurality of datagrams using one or more first identifiers transmitted over the first serial bus; and
   identify the second portion of the plurality of datagrams using one or more second identifiers transmitted over the second serial bus.

19. The apparatus of claim 15, wherein the datagram is one of a plurality of datagrams in a transaction conducted between the first device and the second device, and wherein the first device is further configured to:
   transmit a first portion of the plurality of datagrams over the first serial bus and a second portion of the plurality of datagrams over the second serial bus when the first serial bus is active but not expected to transmit the datagram within the time limit defined by the latency budget and the second serial bus is active.

20. The apparatus of claim 16, wherein the first expected latency and the second expected latency are determined using a history of prior transmissions and associated latencies.

21. A processor-readable storage medium comprising code for:
   receiving a datagram to be transmitted from a transmitting device to a receiving device, wherein the datagram is associated with a latency budget;
   determining whether a first serial bus coupling the transmitting device to the receiving device is available to transmit the datagram, wherein the first serial bus is available to transmit the datagram when the first serial bus is active and likely to transmit the datagram within a time limit defined by the latency budget;
   determining whether a second serial bus coupling the transmitting device to the receiving device is available to transmit the datagram, wherein the second serial bus is available to transmit the datagram when the second serial bus is active and likely to transmit the datagram within the time limit defined by the latency budget;
   transmitting the datagram over the first serial bus when the first serial bus is available; and
   transmitting the datagram over the second serial bus when the second serial bus is available and when the first serial bus is not available.

22. The storage medium of claim 21, wherein the datagram is one of a plurality of datagrams in a transaction conducted between the transmitting device and the receiving device, further comprising code for:
   transmitting a first portion of the plurality of datagrams over the first serial bus while concurrently transmitting a second portion of the plurality of datagrams over the second serial bus when the first serial bus is available and the second serial bus is available.

23. The storage medium of claim 21, further comprising code for:
   transmitting the datagram over the second serial bus when the second serial bus is available, and when the first serial bus is not active or not expected to transmit the datagram within the time limit defined by the latency budget.

24. The storage medium of claim 21, further comprising code for:
   estimating a first expected latency for transmitting the datagram based on transactions that are ongoing or queued for the first serial bus;
   determining that the datagram can be transmitted over the first serial bus within the time limit defined by the latency budget when the first expected latency is less than the time limit defined by the latency budget;
   estimating a second expected latency for transmitting the datagram based on transactions that are ongoing or queued for the second serial bus; and
   determining that the datagram can be transmitted over the second serial bus within the time limit defined by the latency budget when the second expected latency is less than the time limit defined by the latency budget,
   wherein the first expected latency and the second expected latency are determined using a history of prior transmissions and associated latencies.

25. The storage medium of claim 22, further comprising code for:
   identifying the first portion of the plurality of datagrams using one or more first identifiers transmitted over the first serial bus; and
   identifying the second portion of the plurality of datagrams using one or more second identifiers transmitted over the second serial bus.

26. An apparatus comprising:
   means for receiving a datagram to be transmitted from a transmitting device to a receiving device, wherein the datagram is associated with a latency budget;
   means for determining whether a first serial bus coupling the transmitting device to the receiving device is available to transmit the datagram;
   means for determining whether a second serial bus coupling the transmitting device to the receiving device is available to transmit the datagram; and
   means for transmitting the datagram, wherein the datagram is transmitted over the first serial bus when the first serial bus is active and likely to transmit the datagram within a time limit defined by the latency budget, and wherein the datagram is transmitted over the second serial bus when the second serial bus is active and likely to transmit the datagram within the time limit defined by the latency budget and when the first serial bus is not active or unlikely to transmit the datagram within the time limit defined by the latency budget.

27. The apparatus of claim 26, wherein the datagram is one of a plurality of datagrams in a transaction conducted between the transmitting device and the receiving device, and wherein the means for transmitting the datagram is configured to transmit a first portion of the plurality of datagrams over the first serial bus while concurrently transmitting a second portion of the plurality of datagrams over the second serial bus when the first serial bus is active and likely to transmit the datagram within the time limit defined by the latency budget and the second serial bus is active and likely to transmit the datagram within the time limit defined by the latency budget.

28. The apparatus of claim 26, wherein the means for transmitting the datagram is configured to transmit the datagram over the second serial bus when the second serial bus is active and likely to transmit the datagram within the time limit defined by the latency budget, and when the first serial bus is not active or not expected to transmit the datagram within the time limit defined by the latency budget.

29. The apparatus of claim 26, further comprising:
means for estimating latency,
wherein a first expected latency for transmitting the datagram is estimated based on transactions that are ongoing or queued for the first serial bus,
wherein the datagram can be transmitted over the first serial bus within the time limit defined by the latency budget when the first expected latency is less than the time limit defined by the latency budget,
wherein a second expected latency for transmitting the datagram is estimated based on transactions that are ongoing or queued for the second serial bus,
wherein the datagram can be transmitted over the second serial bus within the time limit defined by the latency budget when the second expected latency is less than the time limit defined by the latency budget, and
wherein the first expected latency and the second expected latency are determined using a history of prior transmissions and associated latencies.

30. The apparatus of claim 27, wherein the means for transmitting the datagram is further configured to:
identify the first portion of the plurality of datagrams using one or more first identifiers transmitted over the first serial bus; and
identify the second portion of the plurality of datagrams using one or more second identifiers transmitted over the second serial bus.

* * * * *